United States Patent [19]
Witte et al.

[11] Patent Number: 4,961,476
[45] Date of Patent: Oct. 9, 1990

[54] ARRANGEMENT FOR CONTROLLING THE POWER TRANSMISSION TO AT LEAST TWO AXLES OF A MOTOR VEHICLE

[75] Inventors: Lothar Witte, Vaihingen; Norbert Stelter, Weissach; Ulrich Appt; Rolf Geiger, both of Stuttgart; Klaus-Gerhard Wolpert, Korntal-Münchingen; Stephen Lawitzki, Weissach-Flacht, all of Fed. Rep. of Germany

[73] Assignee: Dr. Ing. h.c.F. Porsche AG, Fed. Rep. of Germany

[21] Appl. No.: 330,762

[22] Filed: Mar. 30, 1989

[30] Foreign Application Priority Data

Apr. 2, 1988 [DE] Fed. Rep. of Germany ....... 3811214

[51] Int. Cl.⁵ .............................. B60K 17/348
[52] U.S. Cl. ..................... 180/197; 180/247; 303/100; 364/426.02
[58] Field of Search ............. 180/197, 247, 248; 364/424.01, 426.02; 303/100, 110

[56] References Cited

U.S. PATENT DOCUMENTS

| 4,032,197 | 6/1977 | Kohler | 180/197 |
| 4,844,557 | 7/1989 | Giers | 364/426.02 |

FOREIGN PATENT DOCUMENTS

| 64669 | 11/1982 | European Pat. Off. ........... 180/197 |
| 0215352 | 8/1986 | European Pat. Off. . |
| 0216318 | 9/1986 | European Pat. Off. . |
| 215352 | 3/1987 | European Pat. Off. . |
| 216318 | 4/1987 | European Pat. Off. . |
| 0245069 | 5/1987 | European Pat. Off. . |
| 245069 | 11/1987 | European Pat. Off. . |
| 3345470 | 5/1986 | Fed. Rep. of Germany . |
| 3626025 | 3/1987 | Fed. Rep. of Germany . |
| 3631180 | 4/1987 | Fed. Rep. of Germany . |
| 3505455 | 7/1987 | Fed. Rep. of Germany . |
| 3608059 | 7/1987 | Fed. Rep. of Germany . |
| 3720459 | 12/1987 | Fed. Rep. of Germany . |
| 3721628 | 1/1988 | Fed. Rep. of Germany . |

OTHER PUBLICATIONS

Brakes and ABs on Four-Wheel Drive Vehicles, SAE, page 15, 2/29/88.

Primary Examiner—Richard A. Bertsch
Assistant Examiner—Eric Culbreth
Attorney, Agent, or Firm—Evenson, Wands, Edwards, Lenahan & McKeown

[57] ABSTRACT

The arrangement controls a friction element for limiting a rotational speed compensation between the axles of a two-axle or all-wheel-driven vehicle as a function of the difference of the medium wheel speeds of both axles (longitudinal speed difference). This longitudinal speed difference is compared with two driving-speed-dependent tolerance bands, the first tolerance band being determining for positive and the second tolerance band being determining for negative longitudinal speed differences. If the values of the longitudinal speed differences are above the first or below the second tolerance band, the limiting is increased; if the values are within the tolerance bands, the instantaneous limiting is maintained; and if the values are between the tolerance bands, the limiting is reduced. This arrangement may also be expanded to include an adaptation device of the limit criteria with respect to different tread radii of the wheels and a cornering correction device.

35 Claims, 13 Drawing Sheets

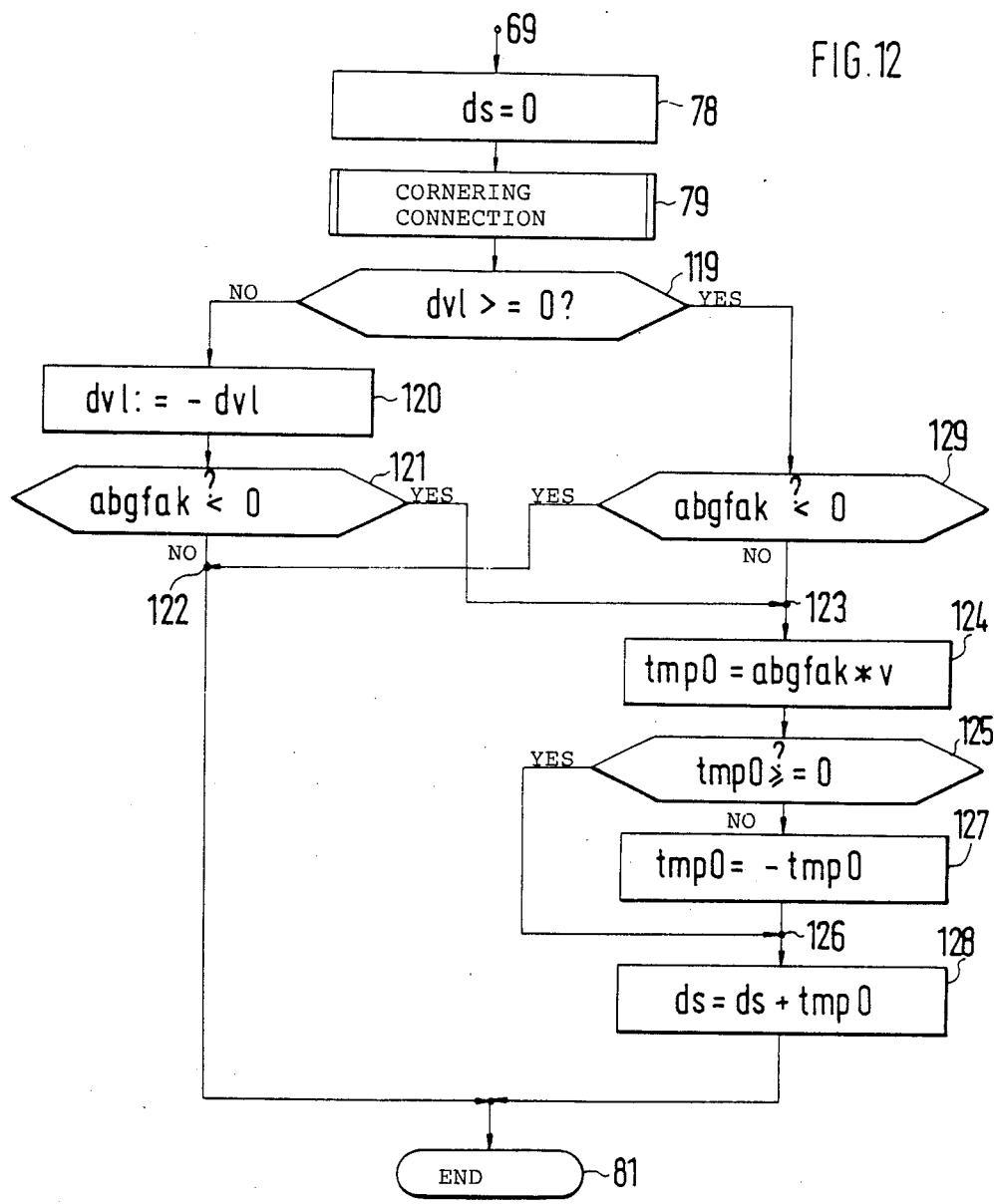

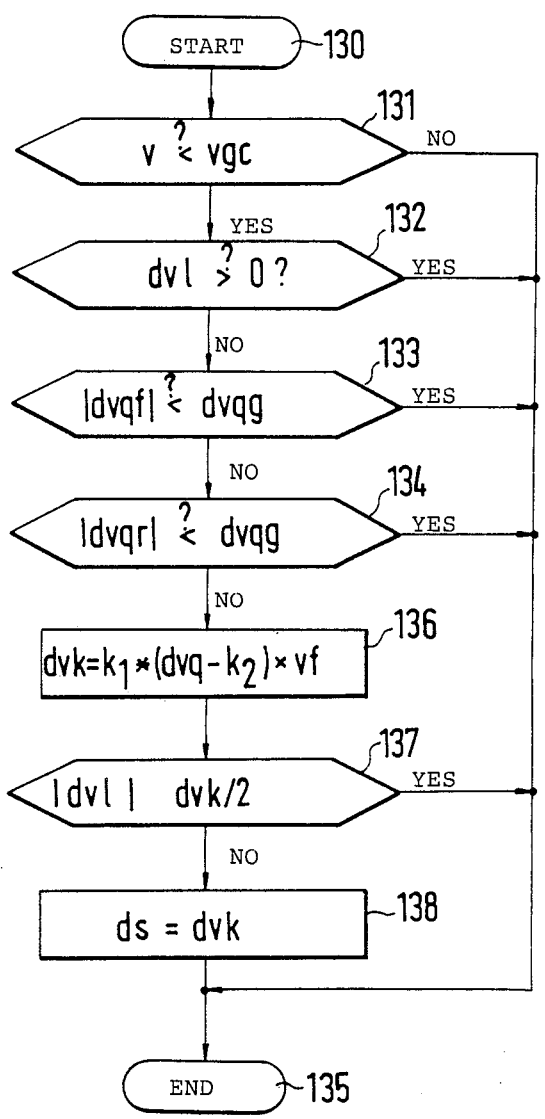

ARRANGEMENT FOR CONTROLLING THE POWER TRANSMISSION TO AT LEAST TWO AXLES OF A MOTOR VEHICLE

BACKGROUND AND SUMMARY OF THE INVENTION

The invention relates to an arrangement for controlling the power transmission to at least two axles of a motor vehicle and more specifically for improved control of a friction element for limiting rotational speed compensation between the axles.

In order to avoid distortions in the drive line between both axles, motor vehicles with a permanent all-wheel drive require a differential device, such as a center differential. This allows rotational speed differences between the wheels of both axles to occur, for example, during cornering or in the case of tires with different tread radii.

When only one axle loses static friction between the wheels and the road surface, however, it is known that as a result of the differential effect of the center differential, the driving power of the whole drive is lost. Thus the use of an all-wheel drive of this type does not seem to be very useful without a device for limiting the differential effect such as for example the use of a differential lock or brake.

It is known to use so-called visco-clutches or center differentials that are torque responsive (e.g. limited slip differentials with worm gears) for limiting the differential effect. These automatically operating elements have disadvantages resulting from their basic principle, since they may become operative even during tight cornering or when tread radii of the wheel are very different. Thus they prevent a rotational speed difference between the axles, which is required with respect to the dynamics of vehicle movement. However, this limits the maneuverablity of the vehicle particularly on a smooth road surface, and any narrow cornering can bring on the so-called "narrow-corner braking".

On the basis of DE-OS No. 35 05 455, an arrangement has become known for the automatic connecting and disconnecting of driving elements of a motor vehicle. In this case, the motor vehicle is normally driven by means of only one axle. When certain threshold values are reached with respect to dynamics of vehicle movement such as a certain speed slip between the wheels of two axles, a second driving axle, a differential gear lock, a rear axle differential lock and a front axle differential lock are then connected in steps by a shiftable clutch and a differential gear.

It is known from this text that the threshold values for the connecting and disconnecting of the driving elements must be very low, so that an effectiveness is achieved that is sufficient with respect to the dynamics of vehicle movement and thus an improvement of the vehicle handling in comparison to conventional driving systems is obtained. However, this requires a cornering recognition and correction which, in this case, takes place by a steering angle sensor.

For the recognition of different tread radii of the wheels, an electronic adaptation system is also provided which corrects the measured wheel rotational speed values correspondingly.

However, the connecting and disconnecting of a vehicle axle, because of the advantages with respect to the dynamics of vehicle movement (directional control) offered by a permanent all-wheel drive, does not seem to be very useful. Likewise, an abrupt connecting and disconnecting of driving components can be used only in vehicles having a large inertial mass, because this connecting or disconnecting, always results in a "jerk" and otherwise have a negative effect on vehicle handling comparable to a load change reaction.

In addition, the correction of the wheel rotational speed values by the electronic adaptation system results in the difficulty that although the connecting of the driving components takes place correctly, the disconnecting of the locks under certain operational circumstances can no longer be carried out solely as a function of the slip. The reason for this is that when the lock is completely connected, it prevents rotational speed differences of the wheels, in which case it is unimportant whether the rotational speed differences are caused by different tread radii of the wheels or by road grip. The corrected wheel rotational speed values also make the decision to disconnect more difficult.

It is therefore the object of the invention to provide an arrangement for controlling the power transmission to at least two axles of a motor vehicle for limiting rotational speed compensation between the axles that requires a minimal input of sensed operating and/or driving parameters and at the same time entails low expenditures with respect to measuring and control techniques. A further object of the present invention is to provide a power transmission control that has an optimal overall performance with respect to the dynamics of motor vehicle movement in almost all driving situations.

The advantages of the invention are mainly that an arrangement for controlling the power transmission to at least two axles of a motor vehicle is provided through a friction element that limits a rotational speed compensation between axles with a low input of sensed operational and/or driving parameters. The control is provided in such a manner that optimal overall performance of the motor vehicle is achieved with respect to the dynamics of vehicle movement in almost all driving situations. The expenditures with respect to measuring and control techniques for this purpose are low, because the control can largely be integrated into a control apparatus of an antilock brake system (ABS). As a result of the control of speed-dependent tolerance bands for speed differences between the powered axles, an abatement of the control behavior is achieved, as well as soft but sufficiently fast transition behavior between the conditions of an unlimited compensating effect and a completely restricted rotational speed compensation.

Other advantages are obtained when a threshold criterion is adapted for influencing the limiting of the compensating effect of the center differential in the case of wheels with different tread radii. As a result, no additional measuring values or criteria must be used for the disconnecting or reduction of the limiting of the compensating effect. In addition, a cornering adapation system provides that, tight cornering may also be driven without any problems particularly in the lower speed range, and an unacceptably high slip occurring at one axle, is recognized correctly.

Other objects, advantages and novel features of the present invention will become apparent from the following detailed description of the invention when considered in conjunction with the accompanying drawings.

BRIEF DESCRIPTION OF THE DRAWINGS

FIG. 12 is a flow chart for determining a correction value;

FIG. 13 is a flow chart for a cornering correction.

DETAILED DESCRIPTION OF THE DRAWINGS

Figure 1:
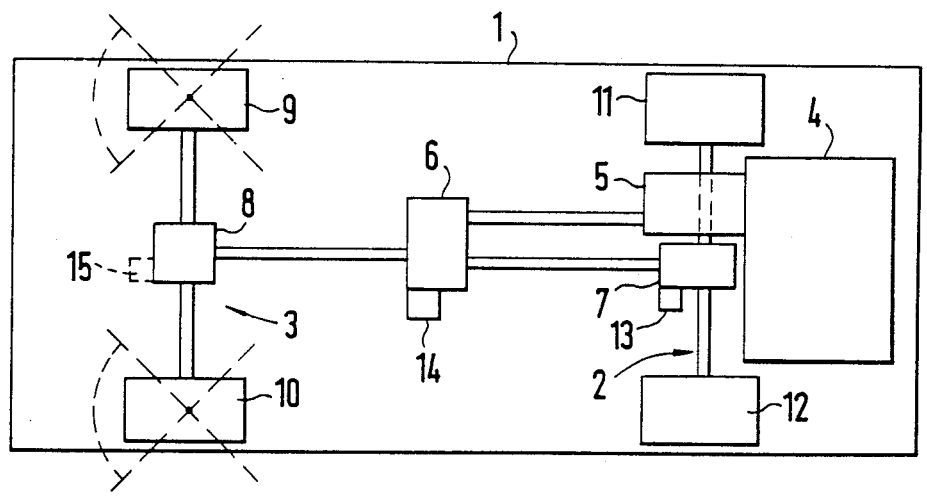
FIG. 1 is a schematic view of a drive assembly of a motor vehicle.

In FIG. 1, reference number 1 indicates an all-wheel-drive motor vehicle having a first powered or rear axle 2 and a second powered or front axle 3. For example, in the area of the first axle 2, an internal-combustion engine 4 is arranged, which, via a clutch transmission unit 5 and a center differential 6 drives a transverse differential 7 of the first axle 2, and a differential 8 of the second axle 3. The center differential 6 is a electrohydraulically operated differential brake for limiting the compensating effect, and transverse differential 7 can be preferably and continuously limited or controlled in its compensating effect. Differential 8 is constructed as a conventional differential gear, however, it may also be a self-locking differential gear, or a differential gear which can be limited or controlled continuously in its compensating effect. Wheels 9, 10 at the second axle 3 are constructed to be steerable, while wheels 11, 12 of the first axle are not steerable. Control elements 13, 14 for controlling the limiting of the compensating effect and transverse and center differentials 6 and 7 are shown only symbolically. A control element 15 at the differential 8 of the second axle 3 is shown by an interrupted line and is required only in the case of a continuously controllable differential. The control elements 13, 14, 15 may be flanged to the assemblies, may be completely or partially integrated into these assemblies, or may, at least partially, be arranged outside these assemblies and be mechanically, hydraulically, pneumatically or electrically connected with them.

Naturally, the arrangement may also be used in all-wheel drive systems with a controllable longitudinal clutch, as known, for example, from DE-PS No. 36 08 059.

Figure 2:
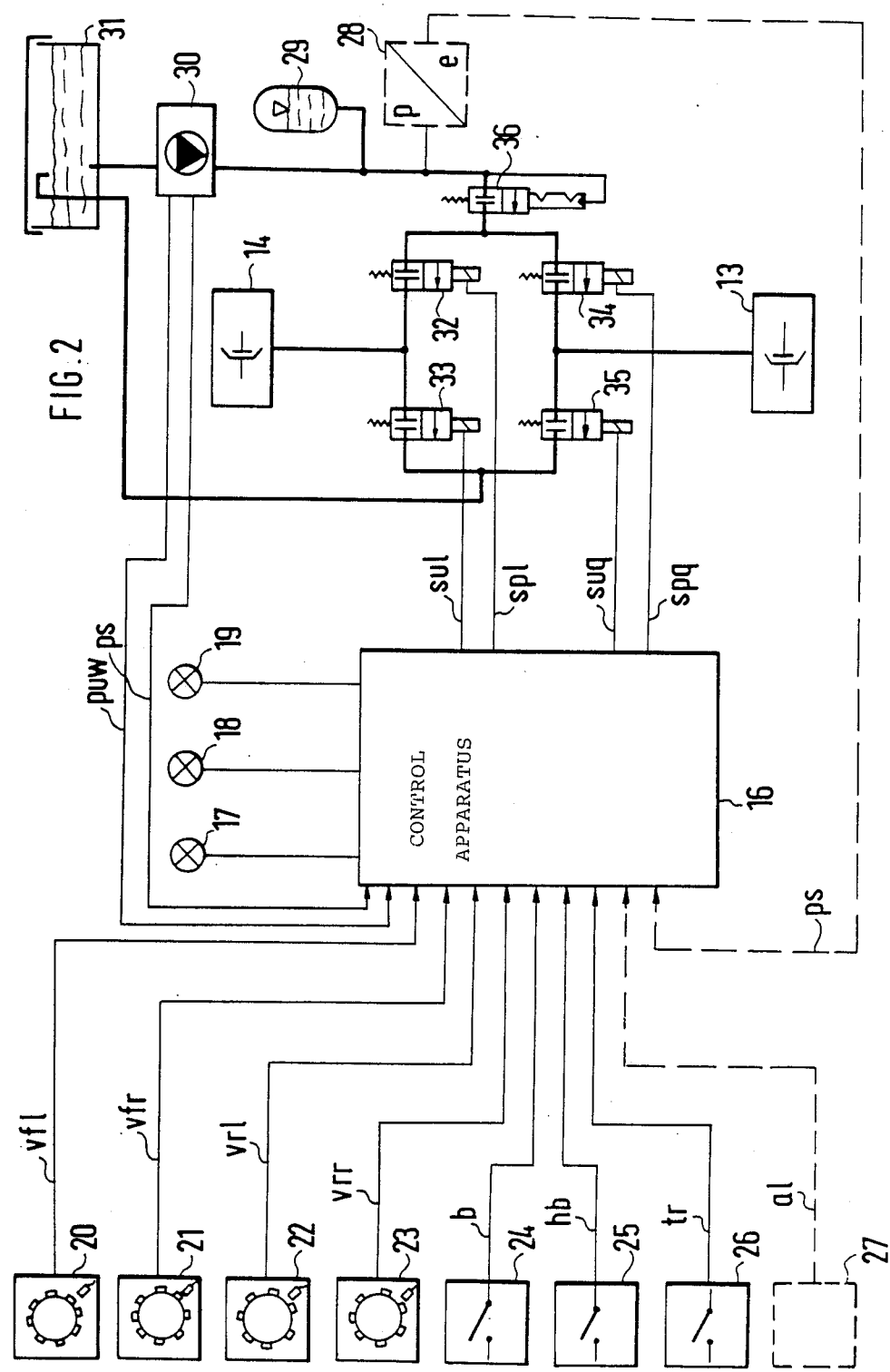
FIG. 2 is a block diagram of the arrangement.

The control apparatus 16 with its input and output values shown in FIG. 2 represents a configuration in which, in addition to controlling the control element 14 of the center differential 6, also controls the control element 13 of the transverse differential 7. A certain number of sensors 20 through 26 is sufficient; although, they may be supplemented by the sensors 27 and 28 indicated by interrupted lines as well as other sensors not shown. A control of control element 15 is not shown and corresponds to that of control element 13.

The control apparatus 16 is preferably constructed on the basis of a microcomputer system, which is known per se (such as Intel 8096), and structurally may be combined with a control apparatus of an antilock brake system (ABS) or of a wheel slip control system (ASR), or may be integrated in or connected by a bus system with at least one of these systems. The construction of the control apparatus 16 corresponds to a conventional microcomputer configuration with a central processing unit, volatile and nonvolatile memories (RAM, ROM, EPROM, EEPROM), input and output modules, timers, etc. The construction is therefore not discussed in detail.

Indicator lights 17, 18 and 19, connected to the control apparatus 16, are arranged in the dashboard area of the motor vehicle and provide information to the driver concerning an instantaneous condition of the drive arrangement; for example, which differential brake is controlled (center differential: indicator light 17; transverse differential: indicator light 18). In the same manner, possible defects in the arrangement may also be indicated (indicator light 19). The word "sensing" does not necessarily only indicate the possible sole collecting of a measured quantity or a converting of the measured quantity into another physical quantity, but may also apply to the processing or preprocessing of one or several sensed quantities.

The control unit 16 receives signals vfl, vfr, vrl and vrr from generators 20, 21, which are assigned to wheels 10, 9, and from generators 22, 23, which are assigned to wheels 12, 11. These signals correspond to the speeds of these wheels at the second and first axle 3, 2 or signals to be converted by the control unit 16 into signals or values, which correspond to the wheel speed.

These signals are also those required for an antilock braking system (ABS), so that their sensing in vehicles equipped with such a system may also take place jointly; i.e., they are sensed or converted by one of the two systems and made available to the other system.

The control apparatus 16 also receives signals b, hb, tr from a stop light switch 24, from a hand brake switch 25 and well as from a traction switch 26, by which a complete locking of the center differential and/or of the transverse differential 7 can be controlled respectively.

As additional input values, signals al, ps may be sensed by a longitudinal acceleration sensor or switch 27 and a pressure sensor 28, which senses a pressure ps in a hydraulic accumulator 29. Other input values, which may be sensed, are a condition (monitoring signal puw) of a pump unit 30, which removes pressure medium from a reservoir sump 31, and charges the hydraulic accumulator with it to a certain pressure level range, and a safety pressure signal ps, which is furnished if the pressure in the accumulator 29 falls below a low value. The pump unit 30 contains its own pressure control circuit, which controls this pump unit such that the accumulator is charged to a certain pressure level range. If the pressure falls below the safety pressure, the whole arrangement is depressurized and the indicator light 19 is controlled.

Via a line spl, the control apparatus 16 controls a first pressure build-up valve 32, which connects the control element 14 for the differential brake of the center differential 6 with the pressure accumulator 29. Via a line sul, a first pressure reduction valve 33 is controlled, wherein connects the control element 14 with the sump 31.

Likewise, the control apparatus 16, via an output line spq, furnishes control signals for a second pressure build-up valve 34, which connects the control element 13 of the transverse differential 7 with the pressure accumulator 29. Via a line suq, a second pressure reduction valve 35 is controlled, which can connect the control element 13 with the sump 31. Finally, a safety valve 36 is connected in the pressure medium line between the accumulator 29 and the pressure build-up valves 32, 34 to disconnect the line when the pressure is low.

Figure 3:
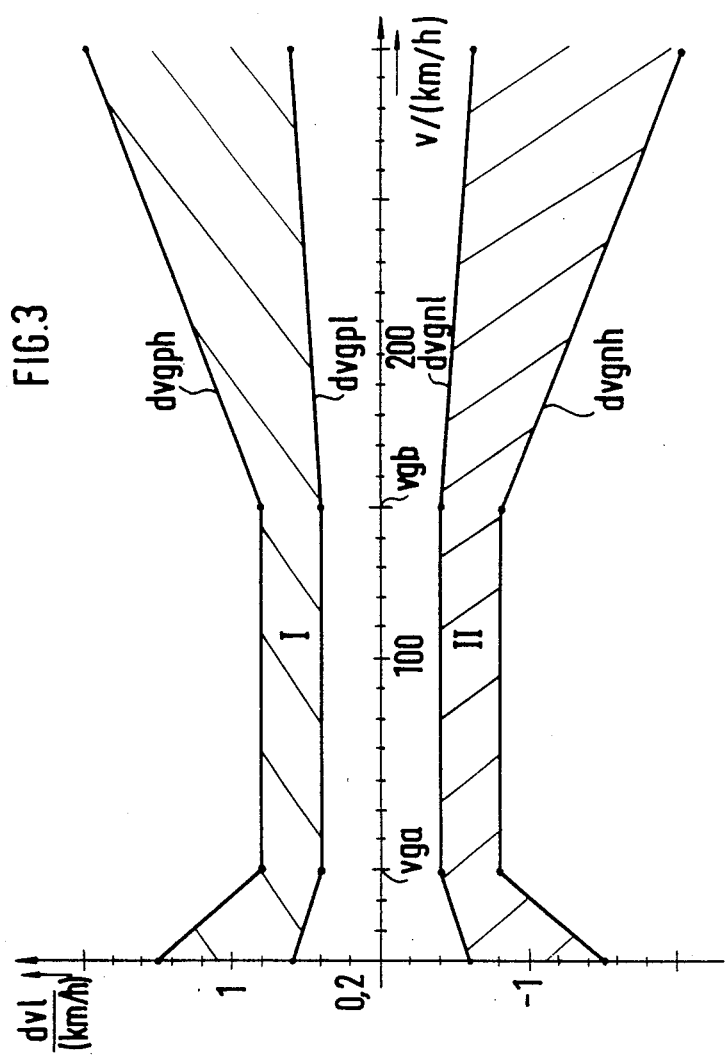
FIGS. 3 is a driving-speed longitudinal-speed-difference diagram with tolerance bands.

FIG. 3 finally shows a diagram, in which control criteria are shown, according to which the control apparatus 16 controls a pressure level in the control element 14 of the center differential 6.

Above the abscissa, the driving speed v is entered in km/h. This driving speed corresponds to the true longitudinal vehicle speed on ground and is taken preferably at the slowest moving wheel, but, if necessary, may also be derived according to other known criteria from the rotational wheel speed signals or wheel speeds vfl, vfr, vrl, vrr.

A longitudinal speed difference dvl is entered in km/h on the ordinate. It is obtained from the difference $dvl = vr - vf$ of the rotational speeds of the axles or of the average speeds of the wheels at the first axle (in this case: the rear axle) $vr = (vrl + vrr)/2$ and of the wheels at the second axle (front axle) $vf = (vfl + vfr)/2$.

In the diagram, a first tolerance band I is arranged in the range of positive longitudinal speed differences $dvl > 0$, and a second tolerance band II is arranged in the range of negative longitudinal speed differences $dvl < 0$. In this case, it is assumed that the tread radii of all four wheels are the same, since otherwise, even when the wheels run without any slip or with the same wheel slip $SRfr = (vfr - v)/v = SRfl = (vfl - v)/v = SRrl(vrl - v)/v = SRrr(vrr - v)/v$, an amount of a stationary longitudinal speed difference $dvl|_{stat} = Sgeo*v$ occurs which rises approximately linearly with the driving speed v, and which may possibly cut the tolerance bands and thus may result in an undesirable and unnecessary control effect. If the tread radii of the wheels per axle and the output ratios of the center differential are intentionally selected to differ, the tolerance bands must be shifted such that they are again placed approximately symmetrically around the stationary longitudinal speed difference $dvl|_{stat}$.

The first tolerance band is composed of an upper limit dvgph and a lower limit dvgpl, which are each a function of the speed:

If the longitudinal speed difference dvl exceeds the upper limit dvgph, an increase of the limiting of the rotational speed compensation takes place, in that the first pressure build-up valve 32 is controlled;

if the longitudinal speed difference dvl is within the first tolerance band I; i.e., between the upper limit dvgph and its lower limit dvgpl, the instantaneous pressure is maintained; i.e., neither the first pressure build-up valve 32 nor the first pressure reduction valve 33 are sent/or receive new control signals;

if the longitudinal speed difference dvl is between both tolerance bands, the pressure reduction valve 33 is controlled to reduce of the limiting of the compensating effect;

if the longitudinal speed difference dvl is within the second tolerance band II; i.e., between its upper limit dvgnl and its lower limit dvgnh, again no new control signals are emitted to the valves 32, 33;

if, on the other hand, the longitudinal speed difference falls below the lower limit dvgnh of the second tolerance band II, the first pressure build-up valve 32 is controlled again to increase the limiting effect.

The tolerance bands I, II or their upper limits dvgph, dvgnl and lower limits dvgpl, dvgnh are dependent on the driving speed. In this case, the first tolerance band I (or its upper and lower limit dvgph, dvgpl), which resides in the range of positive longitudinal speed differences $dvl > 0$, with increasing driving speed v, is preferably falling (or constant) in a lower speed range $0 < v \leq vga$;

constant in a medium speed range $vga < v \leq vgb$; and rising in an upper speed range $v > vgb$.

The second tolerance band II, (or its upper and lower limits dvgl, dvgnh) which resides in the range of negative longitudinal speed differences $dvl < 0$, with increasing driving speed v is preferably rising or constant in a lower speed range $0 < v \leq vga$;

constant in a medium speed range $vga < v \leq vgb$; and falling in an upper speed range $v > vgb$.

In this case, the values indicated in FIG. 3 are to be used only as standard values. However, it was found to be useful, with respect to the effectiveness of the arrangement, for the tolerance bands to be placed in such a low range, that the vehicle handling of a vehicle with an all-wheel drive could be improved decisively. The upper limit dvgph of the first tolerance band I and the lower limit dvgnh of the second tolerance band II, at the end of the central range (at approximately 100 km/h to 150 km/h) correspond to a value of the longitudinal speed difference dvl, relative to the driving speed v or the rotational speed of one axle (axle slip $S = (vr - vf)/vf$), of, for example, 1%. This value may still be below a geometric axle slip value $Sgeo = (vr - vf)/vf|_{SRfl=SRfr=SRrl=SRrr}$, which occurs as a result of normal manufacturing tolerances of vehicle tires in the case of a vehicle which operates without any slip or with the same wheel slip at all wheels $SRfr = SRfl = SRrr = SRrl$ with respect to the road surface. Sgeo, in this case, corresponds to the rise of the longitudinal speed difference $dvl|_{stat}$. Since the latter, particularly in the addressed speed range, may cut the tolerance bands, it is useful to provide the arrangement with an adaptation device, as will be described below. The adaptation device results in a compensation of the stationary longitudinal speed difference $dvl|_{stat}$ or of the geometrical axle slip value Sgeo.

In the upper speed range $v > vgb$, the rise of the tolerance band limit corresponds to approximately the increase of the longitudinal speed difference dvl corresponding to the above-mentioned selected value of the axle slip S. However, the rise may also take into account that the speeds calculated from the signals of the speed generators 20 to 23 are subject to increasing fluctuations at higher driving speeds.

In the lower speed range $0 < v \leq vga$, the lower limit dvgnh of the lower tolerance band II and/or the upper limit dvgph of the upper tolerance band I is preferably designed such that it corresponds to an envelope for the driving-speed-dependent longitudinal speed differences dvl occurring during a cornering of the motor vehicle.

However, the lower limit dvgnh/the upper limit dvgph may also be designed to be higher/lower. But a cornering correcting device must then be provided (see below), which correspondingly takes into account the driving-speed-dependent longitudinal speed differences during cornering.

The pressure build-up and pressure reduction valves 32 to 35 are controlled by pulse-shaped signals (pulse series) from the control apparatus. The pulse-shaped signals are designed such that the rate of change, at which the limiting of the rotational speed compensation occurs, can be controlled and is finite.

This rate of change advantageously differs for the increase and the reduction of the limiting. It may also be a function of the amount of the longitudinal speed difference $|vr-vf|$ and/or its or their change in time $d|vr-vf|/dt$, $d(vr-vf)dt$ and/or of the condition of auxiliary energy carriers (such as accumulator pressure) and/or of the pressure in the control element and/or of a history of a control of the control element.

A pulse series for the control of the first pressure build-up valve 32 has, for example, the following width in time (a plus sign (+) behind the time entry indicates an activating pulse (open valve), and a minus sign (−) indicates a no-pulse period (no control).

4 ms+20 ms−4 ms+20 ms−8 ms+20 ms−8 ms+20
ms−8 ms+20 ms−12 ms+20 ms−12 ms+20
ms−12 ms+20 ms−36 ms+.

A pulse series for the control of the first pressure reduction valve 33, on the other hand, has the following course:

4 ms+240 ms−4 ms+240 ms−4 ms+180 ms−4
ms+180 ms−8 ms+180 ms−8 ms+180 ms−12
ms+180 ms−12 ms+180 ms−12 ms+60 ms−36
ms+.

If the system previously was unpressurized (prior obtaining of a complete pressure reduction pulse series), an activating pulse of a prolonged pulse duration will precede a requested pressure build-up pulse series. In which case, this activating pulse may also be dependent on the accumulator pressure which would require the accumulator pressure to be sensed by sensor 28. The pulse of prolonged duration has the purpose of filling the still vacant or unpressurized lines to the control element 14 and the control element itself 14 (reduction of the downtime of the arrangement).

Examples of activating pulses:
Accumulator pressure 130 bar: 35 ms+20 ms−
Accumulator pressure 150 bar: 30 ms+20 ms−
Accumulator pressure 170 bar: 25 ms+20 ms−

Likewise, in order to avoid hunting, a request for the holding or reduction of the limiting, which in finite time follows a request for the increase of the limiting of the rotational speed compensation, may be delayed in time and/or suppressed.

A build-up pulse series from the control apparatus 16 will be interrupted and a current pulse emitted when the longitudinal speed difference dvl enters into one of the tolerance bands. It will be continued when dvl again exceeds the first tolerance band I or falls below the second tolerance band II.

If, during the relocating of a build-up pulse series dvl enters into the range between the tolerance bands (request for pressure reduction) and remains there, a pressure reduction pulse series will be obtained only after a certain time period has elapsed.

The shortest pulse duration (4 msec) corresponds to a control time which is just long enough for the valves to open reliably. It is advantageous if the program cycle time of a control program, which will be described below, corresponds to the time period of this control time, or the control time of the valves made to be an integral multiple of the program cycle time.

When the control apparatus receives additional signals b, hb from the stop light switch 24 and/or the ABS and/or the hand brake switch 25, the control element 14 is controlled such that, when the service brake is operated, a slow pressure reduction takes place, and when the ABS becomes operative or the hand brake is operated, a fast pressure reduction takes place.

Likewise, in the case of an additional sensing of the pressure in the control element, the ratio of the time duration of activating pulses to no-pulse periods may be reduced with rising pressure or increased with falling pressure.

Figure 4:
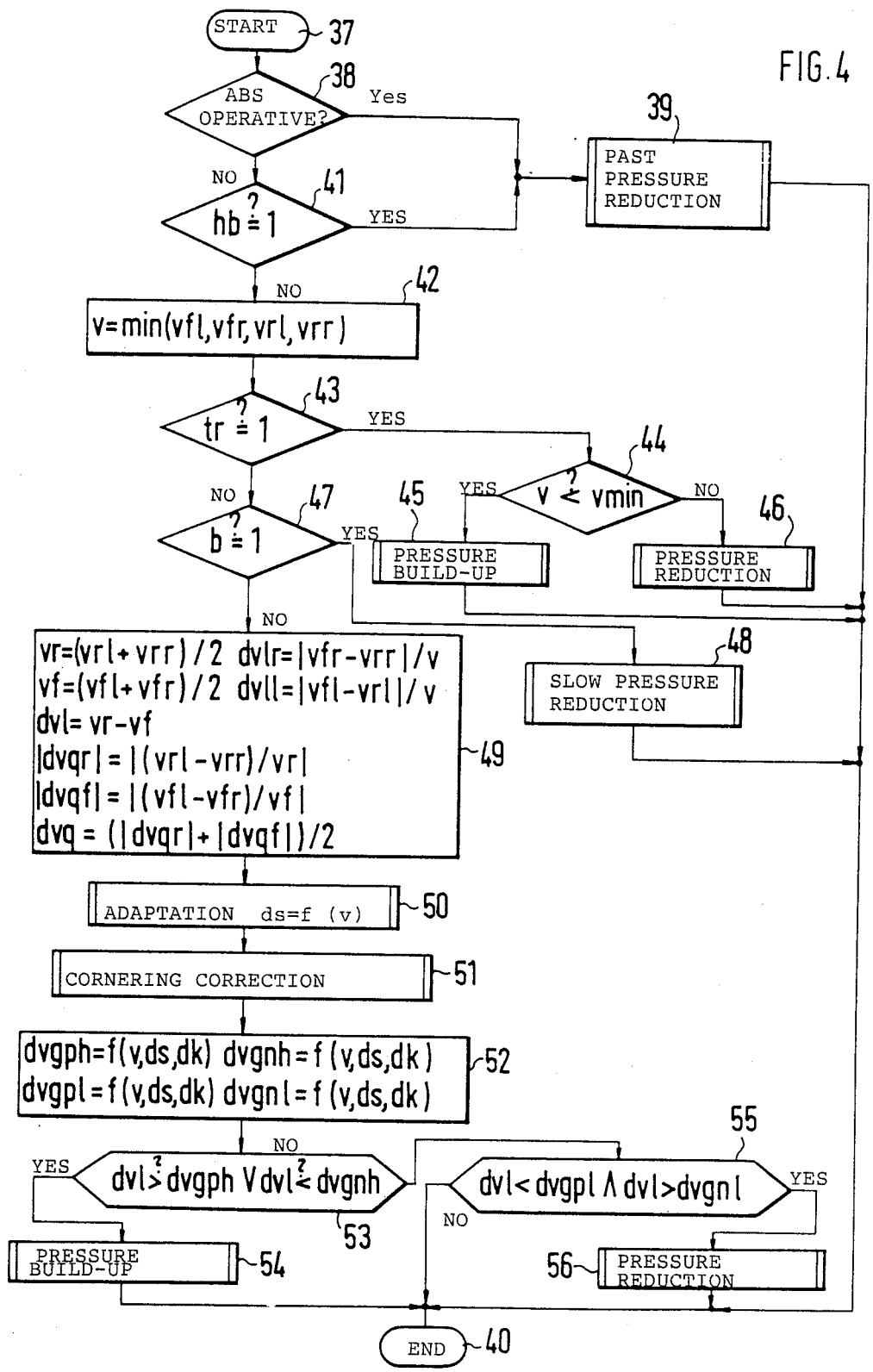
FIG. 4 is a flow chart of a program module.

FIG. 4 is a flow chart for the execution of a program module for the control apparatus 16, which is preferably integrated in a program of an ABS control apparatus or a (not shown) main program module. These contain, among other things, a system initialization as well as cyclic processing of a checking routine for all elements connected to the control apparatus 16, of a sensing and editing routine for the sensor signals with the determination of the wheel speeds and accelerations and of the program module according to FIG. 4.

After a program start 37, a query 38 is first made as to whether the ABS is operative. If this is so, a subroutine 39 is called, which emits control pulses sul to the pressure reduction valve 33 for a fast pressure reduction in the control element 14, and the routine is continued to the routine end 40. There a return takes place either to the ABS program or to the main program.

If the query 38 is negative, it is checked whether the hand brake or switch 25 is operated (signal hb is operative or equal to 1) at 41. If the answer is yes, program step 39 is carried out for a fast pressure reduction. If the answer is no, the driving speed v is determined from the lowest of the speed signals vfl, vfr, vrl, vrr of the wheels of all axles at 42. It is checked whether the traction switch 26 was operated (signal tr operative or equal to 1) at 43. If this is so, it is queried whether v<vmin at 44. If this is so, a subroutine 45 is called up for the control of the pressure build-up in the control elements 13, 14 and the program is continued to the program end 40. If the answer is negative, a subroutine 46 is called up for the control of a pressure reduction in the control elements 13, 14, and subsequently the program is continued to the program end 40.

If query 43 is negative or traction switch 26 is inoperative, it is checked in a further query 47 whether the service brake of the motor vehicle or brake light switch 24 is operated (signal b active or equal to 1): If the answer is yes, a subroutine 48 is called up for the slow pressure reduction in the control element 14, and after its execution, the operation is continued to the program end 40.

If query 47 is negative or the service brake is inoperative, the following values are determined at 49:

Average speed vr of the wheels at the first (rear) axle 2;

average speed vf of the wheels at the second (front) axle 3;

longitudinal speed difference dvl;

amounts of a relative lateral speed difference at the first axle $|dvqr| = |(vrl-vrr)/vr|$;

and at a second axle $|dvql| = |(vfl-vfr)/vf|$; and a relative lateral speed difference $dvq=(|dvqr|+|dvql|)/2$;

a relative longitudinal speed difference of the wheels of one vehicle side $dvlr=|vfr-vrr|/v$;

a relative longitudinal speed difference of the wheels of the other vehicle side $dvll=|vfl-vrl|/v$;

In the next two optional program steps, subroutines, which will be described later with respect to FIGS. 9 and 13 respectively, are called up for the adaptation 50 of the arrangement at the tire with different tread radii and for the cornering correction 51. Subsequently, the limit criteria (limits of the tolerance bands) are determined at 52 from the driving speed v and, if program steps 50, 51 are carried out, also from the adaptation $ds=f(v)$ and the cornering correction $dk=f(dvq, vf)$.

Then it is queried whether the longitudinal speed difference dvl is above the upper limit dvgph or below the lower limit dvgnh at 53. If the answer is yes, a subroutine pressure build-up 54 is called up, and the program 40 is terminated. If the answer is no, it is queried 55 whether the longitudinal speed difference is between the two tolerance bands I, II. If the answer is yes, a subroutine 56 is called up for the pressure reduction, and the program module is terminated, 40. If the answer is no, the program is terminated directly.

The subroutines 39, 45, 46, 48 54, 56 for pressure build up and reduction will not be discussed in detail. For each program run, these subroutines, emit corresponding pulse series to the valves 32 to 35 or their drivers and check the above-described special functions, for example avoidance of hunting. control arrangements and processes, in which the limit criteria, such as rotational speed thresholds or slip thresholds of the tolerance bands, are used as a connecting or disconnecting criterion, or a connecting or disconnecting criterion for friction elements is used for limiting a rotational speed compensation.

On the one hand, the limit criteria must be very low for a good effectiveness without any change of load (connecting threshold; for example, in the case of a ratio of the longitudinal speed difference to the driving speed or in the case of an axle slip value of approximately 1%).

However, the manufacturing tolerances of vehicle tires, on the other hand, are partly above this value, particularly when the axles of the vehicles are equipped with tires of a different tire size (tire width). Other influencing variables may be the tire pressure, the tire wear (which, as a rule, differs as a function of the axle) and the fitting of the tires of one axle with snow chains, or the replacement of one tire by a replacement or emergency wheel, or a load condition of the motor vehicle or the driving on slopes and graded roadways.

Figure 5:
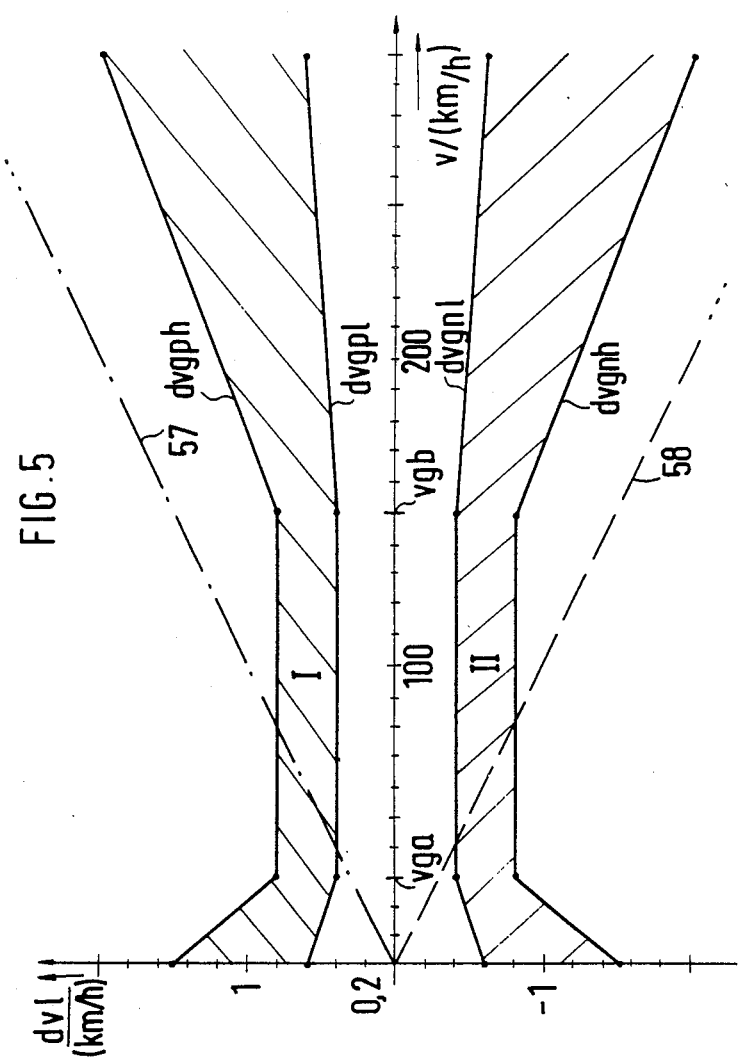
FIG. 5 is a diagram according to FIG. 3, but for vehicle tires with different tread radii.

This situation is explained by a dash-dotted line 57 in FIG. 5. This line 57 corresponds to a stationary longitudinal speed difference $dvl|_{stat}=Sgeo*v$, which arises when a tread circumference of the wheels of a first axle is by only 1% smaller than a tread circumference of the wheels of a second axle. Line 57 therefore rises linearly with the vehicle speed v. In the shown case, even starting at a driving speed of 80 km/h, a limit criterion dvgph for the connecting or controlling of the friction member would be exceeded constantly, without the occurrence of any significant wheel slip of the wheels of one axle with respect to the road surface or of a difference in the wheels slip between the wheels (SRfr=SRfl=SRrr=SRrl)!

In DE-OS No. 35 05 455, it was therefore suggested to equip an electronic unit for the controlling of clutches or locks of differential gears with an adaptively operating electronic adaptation system, which compensates measured values of the rotational wheel speeds corresponding to the deviations occurring in the normal operation.

Even though this has the result that line 57 coincides with the speed axis, so that a connecting of a clutch or lock will definitely not take place before an increased wheel slip actually occurs at an axle, under certain circumstances, difficulties will arise with such a system for the adaptation or the compensation of the measured rotational wheel speed values. Although the connecting values are recognized correctly and, for example, a lock is connected correctly, the closed lock of the differential gear hinders its input and output shaft (if the ratios are the same) from rotating at different rotational speeds.

Since the adaptive electronic adaptation system continues to compensate the measured values by the same speed-dependent difference, the longitudinal speed difference values dvl will now extend along line 58, so that above a certain driving speed v (80 km/h), the connecting limit criterion, which is determining for the negative range of longitudinal speed differences, will no longer be exceeded. Thus, the lock remains connected, although an unacceptably high wheel slip may no longer exist at an axle. However, without any additional (critical and wheel-slip-dependent) disconnecting criteria, this results in severe distortions in the drive train and in an increased wear at the friction elements and at the vehicle tires.

Figure 6:
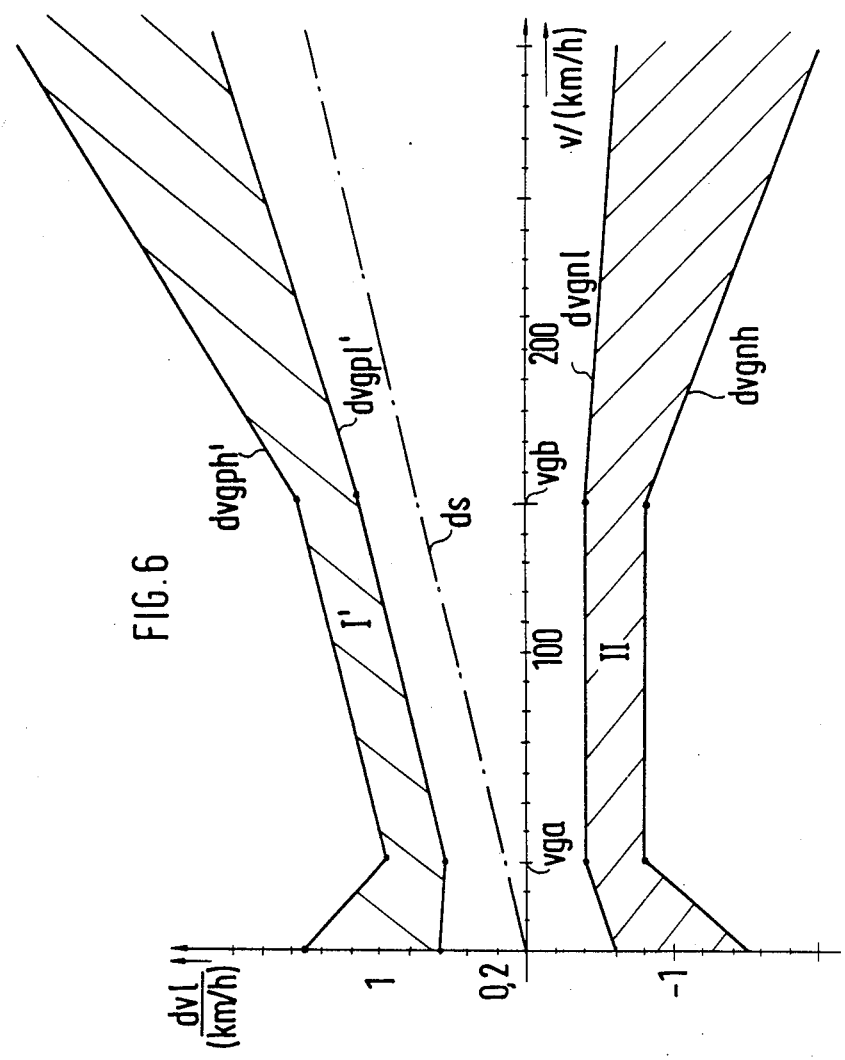
FIG. 6 is a diagram according to FIG. 3, but with adapted tolerance bands.

According to the invention at least one (driving-speed-dependent) limit criterion $dvg=f(v)$ is adapted and not the measured rotational wheel speed values, as shown in FIG. 6. The dash-dotted line ds, at this moment, corresponds again to the stationary longitudinal speed difference $dvl|_{stat}$, which occurs when the wheels run approximately without any slip or with the same slip with respect to the road surface as a result of different tread radii. In this case, a ratio $dvl_{stat}/v*100\%$ of $\frac{1}{2}\%$ is assumed as an example.

The dash-dotted line ds will now precisely indicate the correction value, which is a linear function of the driving speed and by which the limit criterion (in the given case, tolerance band I according to FIG. 3) is additively shifted or (adapted), so that the adapted tolerance band I' is obtained.

As a rule, only that limit criterion needs to be shifted, which extends in the same quadrant as the correction value ds. In the shown case, it is tolerance band I, which was shifted upward. If the correction value ds extends in the 4th quadrant of the dvl/v diagram (ds negative), tolerance band II is corrected downward.

The method of operation is such that, when the friction element is disconnected or controlled away, and the wheels run without any slip or with the same wheel slip, the values for the longitudinal speed differences level out at around line ds. If, for example, an additional positive longitudinal speed difference amount occurs, so that the upper limit dvgph' of the first tolerance band I' is exceeded, the friction element is connected or controlled to be connected. The friction element, which limits the rotational speed compensation, will now, with an increasing control, pull down the longitudinal speed difference dvl in the direction of the v-axis, and, when dvl enters in the adapted first tolerance band I', is no longer controlled, and, in the case of a falling below the lower limit dvgpl', is disconnected or controlled away again.

It should be pointed out that the adaptation naturally will also function when the tolerance bands, in each case, shrink to a switching line, and the friction element is operated in the switching mode. However, in this case, a certain "switching restlessness" must be expected. It is therefore useful to permit tolerance bands of a certain width and/or to carry out the disconnecting and connecting at finite speed. Additional switch-off criteria, as a rule, are not required.

The sensing of the correction value takes place when the wheels run without any slip or with the same wheel slip. This condition is simulated by the following system conditions:

The limiting of the rotational speed compensation is lifted;

the vehicle speed (v) is within a certain speed window;

the amount of the wheel accelerations (dvfl/dt, dvfr/dt, dvrl/dt and dvrr/dt) of all wheels is below a certain maximum wheel acceleration value;

the motor vehicle is not cornering;

no vehicle brakes are operated; and/or the amount of a static and/or dynamic longitudinal acceleration (dv/dt) of the motor vehicle is below a certain maximum longitudinal acceleration value.

In this case, the system status of the not cornering motor vehicle is obtained from the following criteria:

An amount of a relative lateral speed difference at both axles dvqf=|vfl−vfr|vf, dvqr=|vrl−vrr|/vr is, in each case, smaller than a lateral speed difference value dvqg; and/or an amount of a relative longitudinal speed difference dvlr=|vfr−vrr|/v and dvll=|vfl−vrl|v of the wheels of one respective vehicle side is, in each case, smaller than an longitudinal speed difference limit value dvlg.

The longitudinal acceleration of the motor vehicle may be determined by an acceleration sensor or acceleration switch.

The determination of the correction value ds and its adaptation to the changes in the driving operation of the motor vehicle, in a suitable manner, takes place by finite compensation speed. Preferably, the correction value ds=abgfak*v is obtained from the product of a compensating factor (rise of ds) and the driving speed v. In which case, the compensation factor abgfak itself is determined indirectly or directly and with a finite compensating rate, from values of a longitudinal speed difference (first temporary quantity tmp0=vr/vf−1 or tmp0=(vr=vf)/vf or tmp0=(vr=vf)/v) between the axles 2, 3, which relates to the vehicle speed v (or vf). The first temporary quantity tmpO thus corresponds to the measured value of the geometric axle slip value, Sgeo=dvl|stat/v.

The determination of the compensation factor abgfak advantageously takes place by a sliding average formation. Since significant changes at the tread radii of the wheels occur frequently after the vehicle is stopped (wheel change, pressure losses, mounting of snow chains), it is necessary to determine the correction value immediately after the starting of the motor vehicle or its internal-combustion engine with a higher compensating speed than during the driving operation. For this purpose, it will first be set to a value, which had been stored immediately after the shutting-off of the motor vehicle as the last valid value. The determination of the compensation factor abgfak therefore takes place with a short time constant. For each program run of a computed program, for a sliding average value abgfakmw of the compensation factor abgfak, compensation factor adgfak is a combination of, 1/n of a newly determined value to (n−1)/n of a previously determined value. After a number of program runs, after which the sliding average value abgfakmw has reached the newly determined correction value up to a certain extent, the newly determined value is compared with the stored value, and the new value is used for further calculation only if its amount is higher than the old value and/or its preceding sign has changed. If this is not the case, the old value is used for further calculations.

Another special function is obtained for the following cases:

1. If an immediate control of the control element takes place for limiting the rotational speed compensation before an adaptation after the start could be carried out, and this adaptation is maintained for a given first time period, at least one limit criterion dvgf(v) is increased in its amount by a certain value, until an adaptation can be carried out again.

2. If the increased limiting, in the driving operation, is present for a given second and longer time period, a limit criterion dvg=f(v) is increased in its amount by a certain amount, until an adaptation can be carried out again.

Another conflict of targets for the design of the limit criteria occurs during a cornering of the motor vehicle. It is known in this case that, when small curve radii r are driven, particularly in the low driving speed range, relatively high longitudinal speed differences dvl=vr−vf occur in the negative range.

Figure 7:
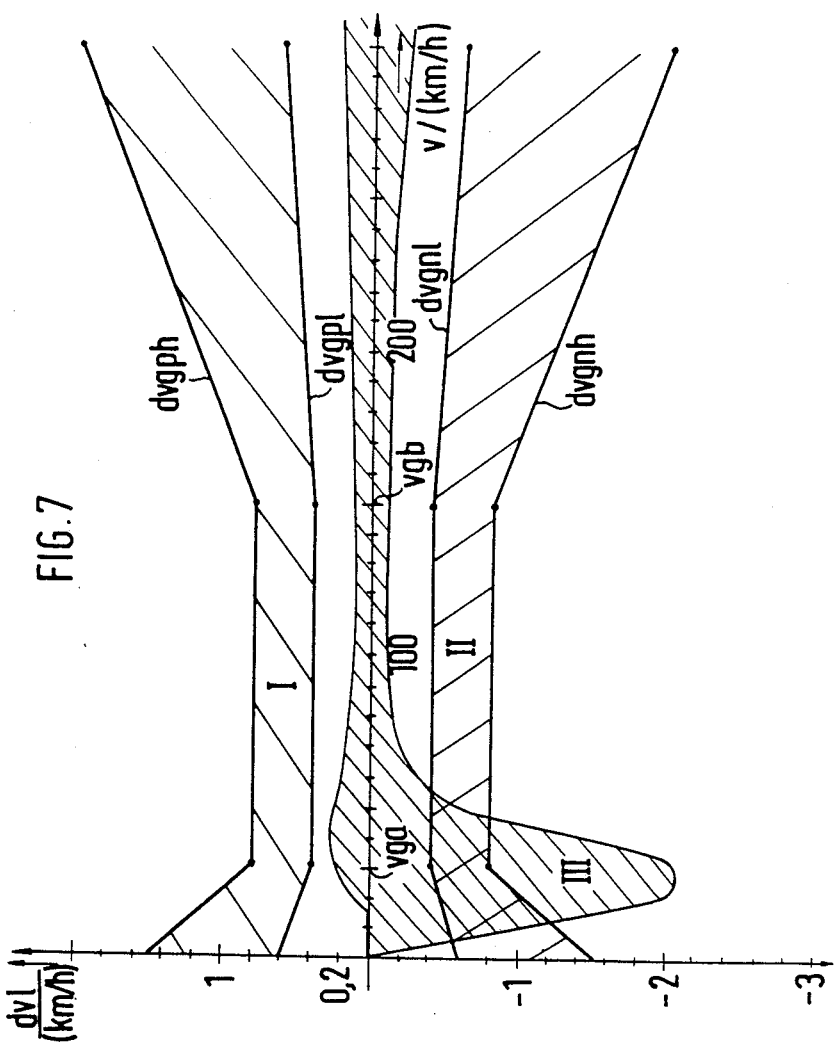
FIG. 7 is a diagram according to FIG. 3, but for cornering.

In FIG. 7, the cornering's effect is shown by the narrowly hatched area III within the speed longitudinal-speed-difference diagram known from FIG. 3. This shows that, the given limit criteria of FIG. 3, even as a result of the longitudinal speed differences occuring during cornering, can control the friction element for the limiting of the rotational speed compensation (i.e., in the range of area III, which is below the lower limit dvgnh of the second tolerance band II. However, this control is not desirable because the impairment of the cornering of the motor vehicle and because of the distortions in the drive train.

It is true that the limit criteria for the control of the friction element can be expanded such that they include area III. dvgnh will then be an "envelope" for almost all possible longitudinal speed differences without any excessive wheel slip at all wheels. However, then the limit criteria are located precisely in that speed range, in which the mimimum of area III occurs, i.e., in a range, which limits the operatability of the arrangement.

It is therefore useful to supplement the arrangement by a cornering correcting device. This device recognizes a cornering of the motor vehicle from the wheel speeds vfl, vfr, vrl and vrr, and corrects at least one driving-speed-dependent limit criterion dvg=f(v) for the longitudinal speed difference dvl=vr−vf, specifically the second tolerance band II, which is below longitudinal speed differences for wheels running without any slip or not with any excessive slip. This takes place in such a manner that the increase of the longitudinal speed difference dvl, which is the result of the cornering, is at least approximately compensated. In this case, the cornering correction takes place only in a lower vehicle speed range $0<v<vgc$ (vgc, for example at 40 km/h).

The cornering correction takes place by a cornering correction value $dvk=k_1*(dvq-k_2)*vf$, which is determined from a product of a first constant factor $k_1$ with a difference between a relative lateral speed difference dvq and a constant $k_2$ and with an average speed $vf=(vfl+vfr)/2$ of a second powered axle 3. The relative lateral speed difference dvq is obtained either from the mean sum of amounts of the lateral speed differences of the wheels at both powered axles $dvq=(|vfl-vfr|/vf+|vrl-vrr|/vr)/2$ or from the amount of the difference of the average speeds of the wheels of one vehicle side respectively $dvq=|(vfl+vrl)/2-(vfr+vrr)/2|/v$.

Figure 8:
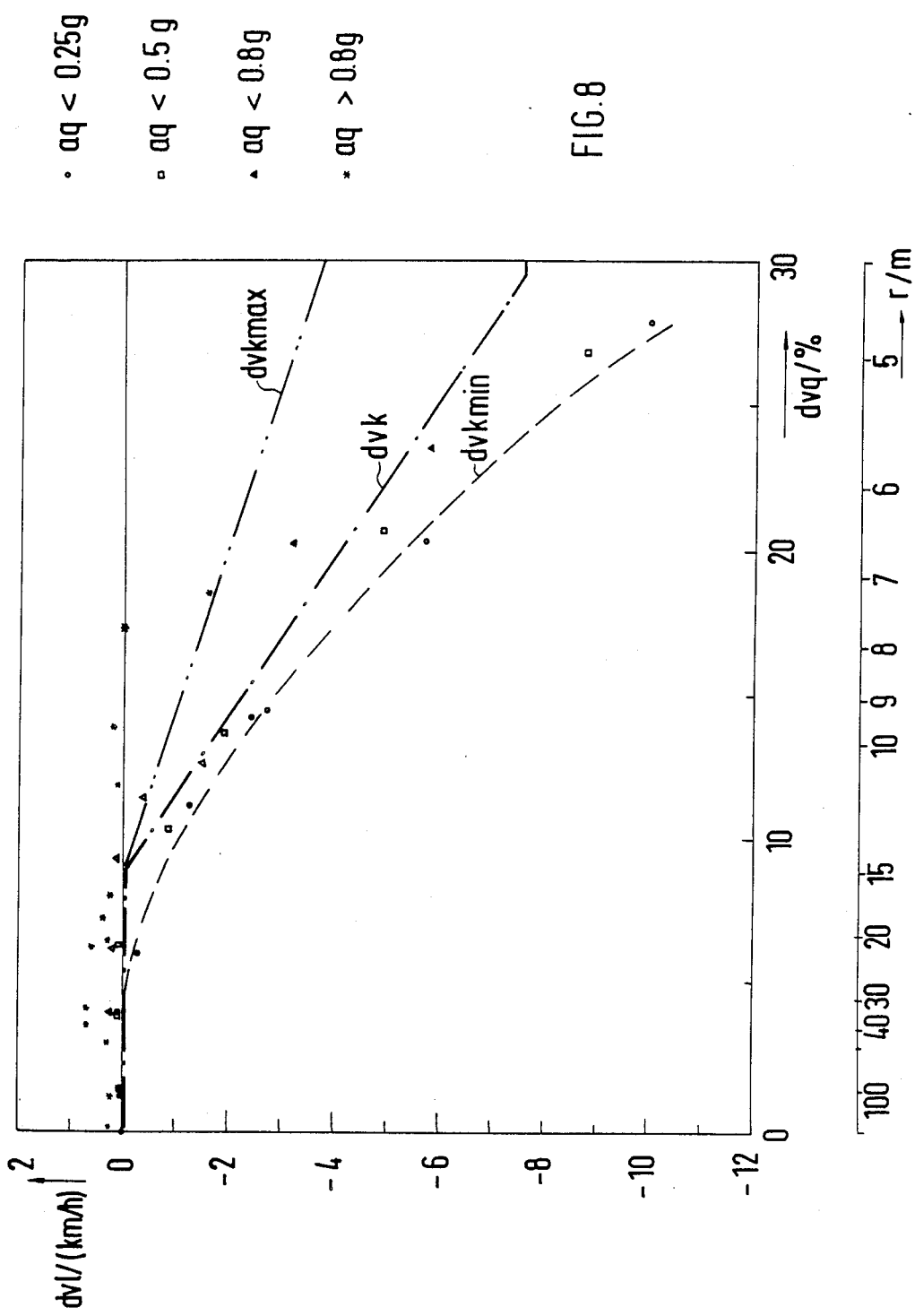
FIG. 8 is a relative lateral-speed-difference longitudinal-speed-difference diagram.

The cornering correction value dvk (dash-dotted line), in FIG. 8, is shown in a diagram, above the abscissa of which the relative lateral speed difference dvq or a cornering radius r is entered (in %), and above the ordinate of which the longitudinal speed difference dvl is entered in km/h. The correction value dvk represents an approximation to the value pairs of the longitudinal speed difference dvl and of the relative lateral speed difference dvq, which occur for different values of lateral vehicle acceleration aq. In this case, the interrupted line dvkmin, as a first approximation, represents the maximal amount limit for the value pairs dvl, dvq. If the values pairs dvl, dvqr are above the dash-doubledotted line dvkmax, no cornering correction takes place, because there the motor vehicle is already outside the directional control range.

The flow charts of FIGS. 9 to 13 described the determination of the adaptation ds and of the cornering correction dk of steps 50 and 51 of FIG. 4 respectively. However, in the representation, both determination are not strictly separated, although, separate determinations would also be possible.

Figure 9:
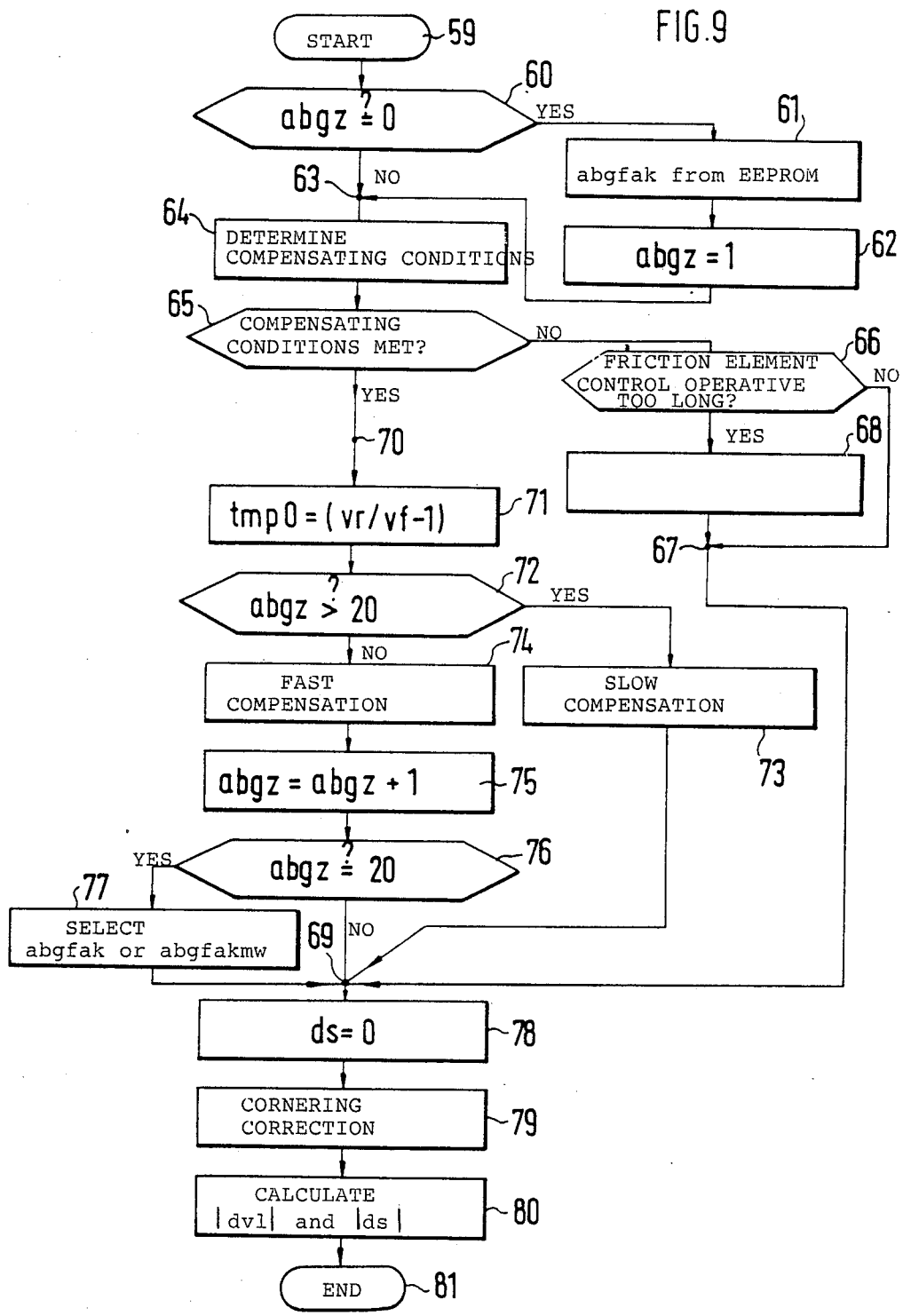
FIG. 9 is a flow chart of an adaptation sequence.

FIG. 9 shows a basic sequence of operations for determining the correction value of the limit criteria adaptation: After the program start 59, it is queried whether a compensation counter abgz, which at a start of the motor vehicle is set to zero and, under certain circumstances, is increased for each program run, is equal to zero, 60. If the answer is yes, a variable compensation factor (abgfak) is called from a non-volatile memory at 61, and the compensation counter abgz is set to 1 at 62, and the operation is continued to a branching point 63, which is also reached when condition 60 is not met.

Then the compensating conditions at 64 are determined and it is queried at 65 whether they are met. If this is not so, whether the friction element control has been operative too long (i.e., that the friction element is not unpressurized) is checked at 66. If the answer is no, the operation is continued to a branching point 67. If the answer is yes, an emergency program 68 is started which, under certain circumstances, sets the compensation factor abgfak to a maximum deviation, and the operation is continued to branching point 67 and from there to branching point 69.

If query at 65 of compensating condition, is positive, after point 70, a relative value of the average speed vr of the wheels of the first axle, relative to the average speed vf of the wheels of the second axle, is assigned to a first temporary quantity tmp0 at 71, and it is queried at 72, whether the compensation counter abgz has reached a certain value 20. In this case, this value is related to the characteristic cycle time (in this case: 4 ms) of the program and/or the framing program and represents that number of program runs which is required so that the average value of the compensation factor abgfakmw can be sufficiently precisely approximated to the measured value of the geometric axle slip value Sgeo.

If query at 72 is yes (driving operation), a slow compensation takes place by a larger number of program runs, at 73, from which a compensation factor abgfak and an average value of the compensation factor abgfakmw is derived. Then a jump takes place to point 69. If, on the other hand, the query at 72 is no, a condition of an unfinished fast compensation exists, and a fast compensation 74 takes place, from which an average value of the compensation factor abgfakmw is obtained. The compensation counter abgz is incremented at 75, and it is queried whether it has reached the certain value 20 at 76. If the answer is no, a jump takes place to point 69. If the answer is yes, it is determined under the above-described conditions at 77, whether the continued calculations are carried out with the compensation factor abgfak, which was present before the fast compensation, or with the average value of the compensation factor abgfakmw, which has arrived in the interim, and the operation is also continued to point 69.

After point 69 is passed, the correction value ds is set to zero at 78, the cornering correction routine at 79 is called up, the amount of the longitudinal speed difference $|dvl|$ and the amount of the correction value $|ds|$ is obtained at 80, which is determined from the adaptation and the cornering correction, and the program module is ends at 81.

In the following, the program steps between points 63 and 67 or 70 are explained by FIG. 10 (query of the compensating conditions and of the emergency operation); the program steps between points 70 and 69 are explained by means FIG. 11 (sliding average value formation; slower/faster compensation); the program steps between point 69 and the program end 81 are explained by FIG. 12; and the cornering correction 79 is explained by FIG. 13.

Figure 10:
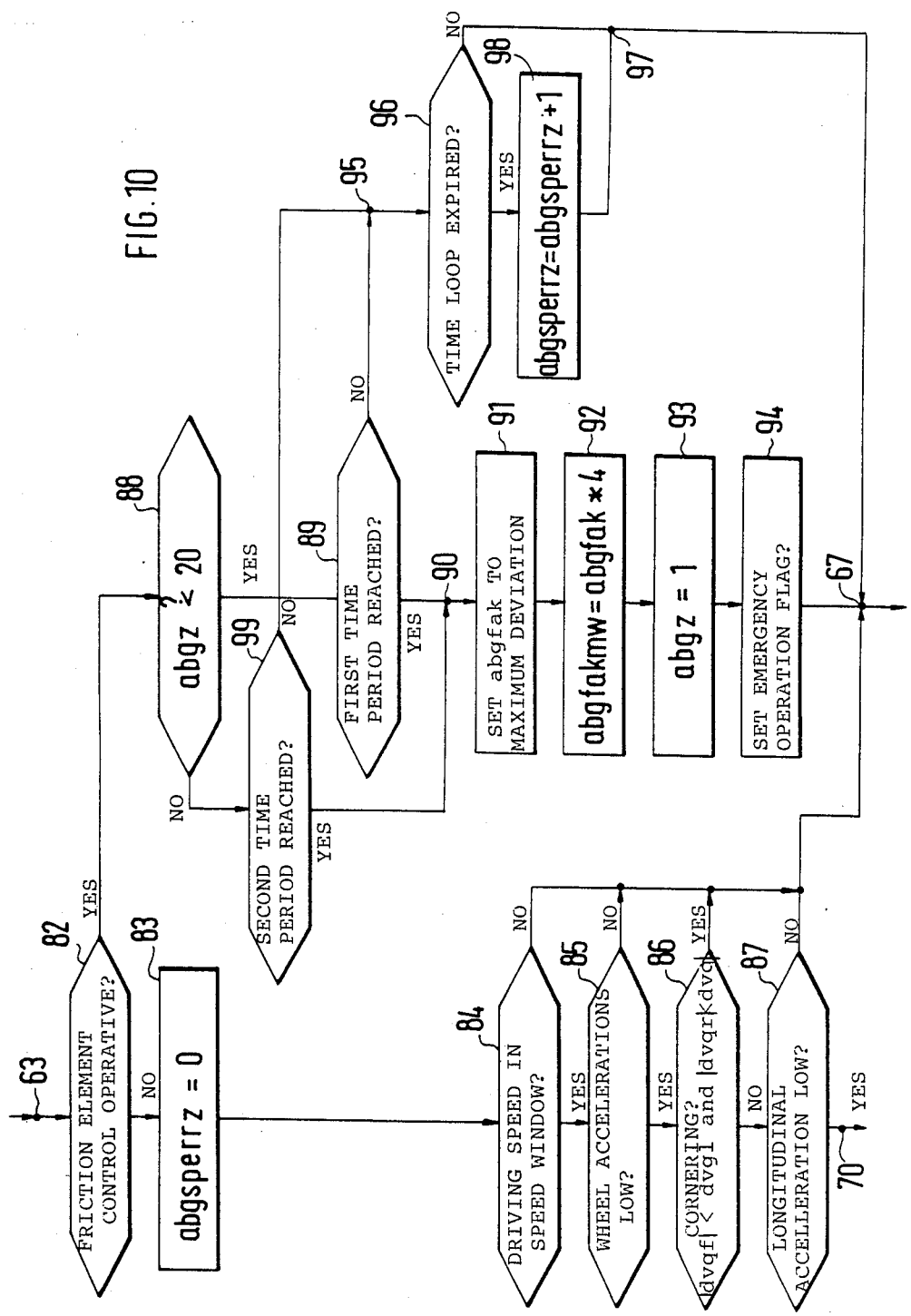
FIG. 10 is a flow chart for the testing of conditions for the adaptation and an emergency program.

In FIG. 10, it is first queried whether the friction element control is operative at 82. If the answer is no, a compensation blocking time abgsperrz is set to zero at 83. Then it is queried whether the driving speed v is within a certain speed window at 84. If the answer is no, the operation goes to point 67. If the answer is yes, it is queried at 85, whether the wheel accelerations of all wheels are lower than a maximum value. If the answer is no, a jump takes place to point 67. If the answer is yes, a check is made at 86 whether the vehicle is cornering. For this purpose, it is checked as to whether the amounts of the relative lateral speed difference $|dvqf|$ and $|dvqr|$ are lower than a limit value dvql, which may reside, for example, at 2%. If the answer is yes, a jump takes place to point 67. If the answer is no, it is queried at 87, as to whether the static and/or dynamic longitudinal acceleration of the motor vehicle is below a certain maximum value. If the answer is no, a jump takes place to point 67; and as to the answer is yes, to point 70.

If query as to whether the friction element control is operative at 82 is yes an "emergency program" is started. It is queried at 88 as to whether the compensation counter abgz is lower than a value 20. If the answer is yes, the program is in the starting operation (immediately after the start of the motor vehicle); or after an emergency operation, and after passing through a first time period query at 89 and a branching point 90, the compensation factor abgfak is set to a maximum deviation (caused, for example, by snow chains or an emergency wheel on one axle) at 91, and the average value of the compensation factor abgfakmw is set to be equal to a multiple, for example, to four times the compensation factor abgfak at 92. The compensation counter abgz is set to 1 at 93, and an "emergency operation" flag is set at 94, and the operation returns to point 67.

If the first time period at 89, has not yet been reached, it is queried, after the passing of branching point 95, whether a time loop 96 has expired. If the answer is no, the operation, passes and, branching point 97 returns to point 67. If the answer is yes, the compensation blocking time abgsperrz is incremented at 98, and a jump takes place to branching point 97 and onto point 67.

If query at 88 is no, the program is in the driving operation, and a query 99 takes place as to whether a second longer time period has been reached. If this is so, a jump takes place to point 90 (increase of the compensation factor abgfak) etc., if not, to point 95.

Figure 11:
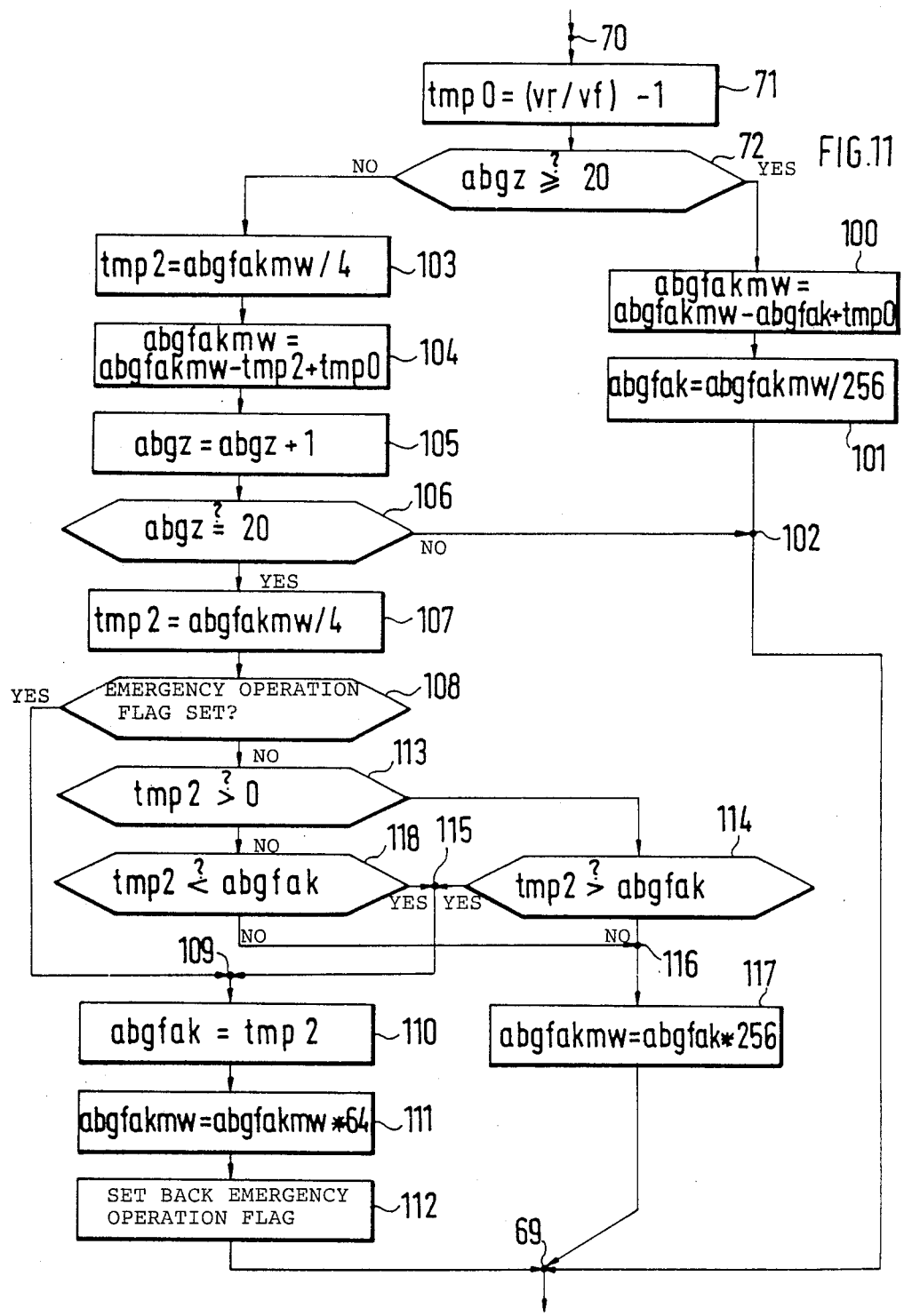
FIG. 11 is a flow chart for forming a sliding average.

When the sliding average value abgfakmw according to FIG. 11 is formed, the query of the compensation counter abgz takes place first at 72, after executing point 70 and program step 71. If this compensation counter abgz is higher than or equal to value 20, which limits the starting operation, a slow compensation takes place in that a new average value of the compensation factor abgfakmw is set to the value of the old average value of the compensation factor abgfakmw, minus the compensation factor abgfak, plus the first temporary quantity tmp0 at 100; and the compensation factor abgfak is set to a certain average value of the compensation factor abgfakmw at 101, which is divided by a higher quotient (256), and after point 102 is passed, a return takes place to point 69.

If query 72 is negative, a fast compensation takes place: A second temporary quantity tmp2 is set to a value which is obtained by the division of the average value of the compensation factor abgfakmw by a smaller quotient 4 at 103. A new, value of abgfakmw is set to the old value of abgfakmw, from which the second temporary quantity tmp2 is subtracted and to which the first temporary quantity tmp0 is added at 104. The compensation counter abgz is incremented at 105, and queried at 106, whether the compensation counter abgz has reached value 20, which characterizes the end of the fast compensation. If the answer is no, a return to point 69 takes place via point 102. If the answer is yes, the second temporary quantity tmp2 is set to a value, which is obtained from the average value of the compensation factor abgfakmw, divided by the smaller quotient (4) at a 107.

It is queried at 108 whether the emergency operation flag is set. If the answer is yes, point 109 is passed, the compensation factor abgfak is set to the second temporary quantity tmp2 at 110; a new average value of the compensation factor abgfakmw is determined from the old value of the average value of the compensation factor abgfakmw, multiplied by a certain value 64 at 111; and the emergency operation flag is set back at 112, and a return takes place to Point 69.

If query 108 of the emergency operation flag being set is negative, it is queried whether the second temporary quantity tmp2 is larger than zero at 113. If the answer is yes, another query takes place as to whether the second temporary quantity tmp2 is larger than the compensation factor abgfak at 114. If the answer is yes, a jump takes place, via point 115, to point 109. If the answer is no, after point 116 was passed, the average value of the compensation factor abgfakmw is set to the value of the compensation factor abgfak, multiplied with the value of the higher quotient (256), at 117, and a return takes place to point 69.

If query 113 is no, it is queried at 118 whether the second temporary quantity tmp2 is smaller than the compensation factor abgfak. If the answer is yes, a branching takes place to point 115 and if the answer is no, to point 116.

The program branch between points 109 and 69 characterizes that system status, in which, after the conclusion of the starting phase, the operation is continued with the newly calculated value of the compensation quantity; whereas the program branch between points 116 and 69 contains the case where the operation is continued using the value which is present as a result of the fast compensation.

In the partial program according to FIG. 12, the correction value ds will now be determined, in that it is first set to zero at 78, and program 79 is called up for determining a cornering correction value dvk. There, this cornering correction value dvk is added to the correction value ds. Subsequently, it is queried whether the longitudinal speed difference dvl is larger than or equal to zero at 119. If the answer is no, dvl is inverted at 120, and it is queried whether the compensation factor abgfak is lower than zero at 121. If the answer is no, the program, after point 122 is terminated at 81, since then the compensation factor abgfak and the longitudinal speed difference dvl are located in different quadrants of the longitudinal-speed-difference speed diagram, and thus is not corrected or corrected only as a result of cornering.

If, however, query 121 is positive, a jump takes place to point 123, starting from which the, first temporary quantity tmp0 is set to a value which is obtained from the compensation factor abgfak (corresponding to the rise of the straight correction line) multiplied by the instantaneous driving speed v (or the average speed of the wheels at the second axle as a reference for the true driving speed on ground) at 124.

In order to form the amount of the first temporary quantity tmp0, it is queried at 125 whether this quantity is larger than or equal to zero. If the answer is yes, the operation is continued to point 126 and if the answer is no, the first temporary amount tmp0 is inverted at 127. After point 126 is passed, a new value of the correction value ds is determined, by adding to the old correction value is (i.e., the cornering correction) to the first temporary quantity tmp0 at 128. Then the program is terminated, 81.

If query 119 whether dvl is greater or equal to zero is yes, it is queried at 129, whether the compensation factor abgfak is lower than zero. If the answer is yes, the operation is continued to point 122; if the answer is no, to point 123.

FIG. 13 finally shows the subroutine for the cornering correction. After the program start 130, conditions for the cornering correction are first queried:

Vehicle speed v lower than a limit value vgc (for example, 40 km/h) at 131;

longitudinal speed difference dvl larger than zero at 132;

amount of the relative lateral speed difference at the second axle |dvqf| lower than a limit value dvqg at 133; and amount of the relative lateral speed difference at the first axle |dvqr| lower than the limit value dvqg at 134.

If condition 131 has not been met, or at least one of conditions 132 to 134 has been met, no cornering correction takes place, and the program is terminated, 135.

If condition 131 has been met, and all of conditions 132 to 134 have not been met (recognized cornering of a higher amount), the cornering correction value is obtained according to formula $dvk = k_1 *(dvq - k_2)* vf$ (by calculation and/or from the diagram according to FIG. 8 filed in a non-volatile memory as the function table) at 136.

If the amount of the longitudinal speed difference dvl is lower than half the cornering correction value dvk, no cornering correction takes place (program end 135). If this is not so, correction value ds is set to cornering correction value dvk, 138, and the program is terminated at 135.

By the two queries 133, 134 and the value $k_2$, the cornering correction takes place only within a useful range of cornering radii, such as 4.5 m≦r≦14.7 m. Values 4 and 256 during the formation of the compensation factors and compensation factor average values as well as value 20 for the compensation counter are values which depend on the program cycle time and the valve dynamics and must not necessarily be in this magnitude. However, they proved to be useful for the given arrangement. Value 20, as the value characterizing the starting operation, is obtained in that, in the case of a sliding average value formation for the compensation factor with the quotient 4 (¼ of the newly calculated value is, in each case, added to the sum of ¾ of the old one), it will, after 20 calculations, practically have reached its final value (jump response). This corresponds to a compensating time of approximately 80 ms. During the slow compensation, 1/256 of the new compensation value is always added to 255/256 of the old compensation value. The response to a jump, in this case, reaches approximately 90% of its final value after approximately 3 seconds.

It should be noted that the adaptation of the limit criterion dvg and the cornering correction may be used in the same manner in antilock brake systems and wheel slip control systems or anywhere where wheel-speed-dependent limit criteria are used for control purposes.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for controlling the power transmission to at least two powered axles of a motor vehicle, having a controllable friction element for limiting rotational speed compensation between the axles;
   a control apparatus for controlling the friction element, by a control element as a function of vehicle operating parameters sensed by sensors;
   wherein the control apparatus includes;
   means for determining a longitudinal speed difference between a rotational average speed of the wheels of a first powered axle and a rotational speed of the wheels of a second powered axle;
   means for comparing the longitudinal speed difference with a speed-dependent first tolerance band defining positive maximum longitudinal wheel speed differences that will allow the vehicle wheels to run without any slip as well as run with an approximately identical wheel slip, and a speed-dependent second tolerance band defining negative maximum longitudinal wheel speed differences that will allow the vehicle wheels to run without any slip as well as run with an approximately identical slip;
   wherein said control apparatus operates the control element in response to the comparison to increase the limiting of the rotational speed compensation when an upper limit of the first tolerance band is exceeded;
   wherein said control apparatus operates in response to the comparison to increase the limiting of the rotational speed compensation when the comparison falls below a lower limit of the second tolerance bank;
   wherein said control apparatus operates in response to the comparison to decrease the limiting of the rotational speed compensation when the comparison falls below a lower limit of the first tolerance band;
   wherein said control apparatus operates in response to the comparison to decrease the limiting of the rotational speed compensation when the comparison exceeds an upper limit of the second tolerance band; and wherein at other times said control apparatus operates the control element in response to the comparison to maintain the limiting of the rotational speed compensation.

2. An arrangement according to claim 1, including means for changing the limiting of the rotational speed compensation at a controllable rate of change.

3. An arrangement according to claim 2, wherein the changing can increase and decrease the limiting of the rotational speed compensation at a controllable rate of change and wherein a rate of this change differs when the limit is increased from when the limit is decreased.

4. An arrangement according to claim 2 wherein the means causing the changing of the limiting of the rotational speed compensation at a controllable rate of change varies the rate of change of the changing as a function of at least one of an amount of the longitudinal speed difference and its change in time.

5. An arrangement according to claim 2, wherein the means causing the changing of the limiting of the rotational speed compensation at a controllable rate of change varies a rate of change of the changing as a function of at least one of a condition of an auxiliary energy carrier of the control element, an amount of a pressure in the control element, and a control history of the control element.

6. An arrangement according to claim 1, including an anti-hunting means for delaying a decrease of the limiting by the control element during a finite time following a request for at least one of an increase and a maintaining of the limiting of the rotational speed compensation.

7. An arrangement according to claim 1, wherein the comparison means includes
   means for providing the first tolerance band in the range of positive longitudinal speed differences, with at least one of a falling and constant value in a lower speed range, a constant value in a medium speed range, and an increasing value in an upper speed range; and
   wherein the comparison means includes means for providing the second tolerance band in the range of negative longitudinal speed differences, with at least one of a rising and constant value in a lower speed range, a constant value in a medium speed range, and a decreasing value in an upper speed range.

8. An arrangement according to claim 7, wherein the means for providing the first tolerance band creates an upper limit of the first tolerance band;
wherein the means for providing the second tolerance band creates a lower limit of the second tolerance band;
wherein values of the upper and lower limits, at an end of a medium vehicle speed range, corresponds to a value of axle slip between both axles, which is below a geometric axle slip value that occurs as a result of normal manufacturing tolerance of vehicle tires, when the vehicle runs without any slip as well as when the vehicle runs with an approximately identical wheel slip at all wheels.

9. An arrangement according to claim 8, wherein the value of axle slip is around 1% at a driving speed in the range of approximately 100 km/h to approximately 150 km/h.

10. An arrangement according to claim 7, wherein, in an upper vehicle speed range, the first tolerance band has a limiting value that approximately corresponds to an increase of the longitudinal speed difference between both axles at a value of axle slip.

11. An arrangement according to claim 7, wherein in a lower vehicle speed range, the means for providing the first and second tolerance bands provides at least one of a lower limit for the second tolerance band and an upper limit for the first tolerance band; and
wherein each of these limits are defined as a set of values that allow for maximum driving-speed-dependent longitudinal speed differences during a cornering of the motor vehicle.

12. An arrangement according to claim 1, wherein said control element includes a pressure piston, an electromagnetic pressure build-up valve for connecting said pressure piston to a pressure source to increase the limiting of the rotational speed compensation and an electromagnetic pressure reduction valve for connecting said pressure piston to a pressure sink to reduce the limiting of the rotational speed compensation; and
wherein said control apparatus produces pulse signals to control said electromagnetic pressure valves.

13. An arrangement according to claim 12, wherein said control apparatus produces a series of rectangular activating pulses and no-pulse periods, and wherein a shortest pulse of said series of pulses has a time duration such that the controlled electromagnetic valve has just enough time to open.

14. An arrangement according to claim 12 wherein said control apparatus initiates a pressure build-up by an activating pulse with a prolonged pulse duration when following a raising of the limit.

15. An arrangement according to claim 1, wherein the control apparatus includes a microcomputer system which senses speeds of the wheels of the motor vehicle through speed sensors located at these wheels, and wherein the microcomputer determines control values for the control element, and controls the control element as a function of the wheels speeds sensed through the speed sensors.

16. An arrangement according to claim 15, wherein the control apparatus also senses signals from at least one of: a stop light switch, an antilock brake system, and a hand brake switch and wherein the control apparatus controls the control element such that, when the service brake is actuated, a slow reduction of the limiting of the rotational speed compensation takes place, and when the antilock brake system becomes operative as well as when the hand brake is actuated, a fast decrease of the limiting of the rotational speed compensation takes place.

17. An arrangement according to claim 15, wherein the control element includes a pressure piston;
wherein said control apparatus senses a pressure in the pressure piston of the control element by a pressure sensor;
wherein said control apparatus reduces a relationship of a respective time duration from activating pulses to no-pulse periods;
wherein said control apparatus increases the relationship when the pressure rises; and
wherein said control apparatus increases the relationship when the pressure falls.

18. An arrangement for controlling the power transmission to at least two powered axles of a motor vehicle, having a controllable friction element for limiting rotational speed compensation between the axles;
a control apparatus for controlling the friction element, by a control element as a function of vehicle operating parameters as sensed by sensors;
wherein the control apparatus also includes an adaptation device which comprises:
means for sensing a speed-dependent deviation in a longitudinal speed difference between a rotational speed of the wheels of a first powered axle and a rotational speed of the wheels of a second powered axle from the longitudinal zero speed difference that occurs when vehicle wheels run without any slip as well as when they run with approximately the same slip;
said means for sensing including speed sensor means for measuring wheel speeds of the vehicle;
said sped-dependent deviation being caused by different tire tread radii;
said means for sensing causing said control apparatus to provide limiting control criteria for said control element in response to said speed-dependent deviation;
means for modifying said limiting control criterion by changing the longitudinal speed difference to limit rotational speed compensation of said limiting control criteria by a correction value as a linear function of the driving speed.

19. An arrangement according to claim 18, wherein said means for modifying carries out said modifying only when the vehicle wheels run approximately without any slip as well as when the wheels run with approximately the same slip.

20. An arrangement according to claim 19, including means for determining when the vehicle wheels run with approximately no slip as well as when the wheels run with approximately the same slip;
said means for determining causing said means for modifying to operate upon the occurrence of any one of the following system conditions:
limiting of the rotational speed compensation is lifted,
vehicle speed is within a certain speed range;
an amount of wheel accelerations of all vehicle wheels is below a certain maximum value of wheel acceleration,
the motor vehicle is not cornering,
no vehicle brakes are actuated, the amount of a static longitudinal acceleration of the motor vehicle is below a certain maximum value of longitudinal acceleration, and the amount of a dynamic longitudinal acceleration of the motor vehicle is below a certain maximum value of longitudinal acceleration.

21. An arrangement according to claim 20, wherein said determining means determines that the motor vehicle is not cornering, upon the occurrence of any one of an amount of a relative lateral speed difference of the wheels of the first powered axle and the second powered axle are lower than a relative lateral speed difference limit value, and amounts of relative longitudinal speed differences between wheels on one vehicle side are lower than a longitudinal speed difference limit value.

22. An arrangement according to claim 20, wherein said determining means determines the amount of at least one of the static and the amount of dynamic longitudinal acceleration of the motor vehicle below a certain maximum longitudinal acceleration value, in response to vehicle acceleration.

23. An arrangement according to claim 18, including means for additionally controlling a rate of the determination of the correction value and its modification.

24. An arrangement according to claim 18, wherein the correction value is a product of a compensation factor and vehicle speed, and wherein there is a timing means for determining the compensation factor at a finite compensating rate from values of a longitudinal speed difference between the axles relative to the driving speed.

25. An arrangement according to claim 24, wherein the limiting control that forms the correction value, the compensation factor and its modification, includes means for forming a sliding average value of the correction valve compensation factor.

26. An arrangement according to claim 24, wherein the correction value and the compensation factor are at a higher compensating rate immediately after the starting of the motor vehicle than during the driving operation.

27. An arrangement according to claim 24 including means for setting the correction value and the compensation factor, immediately after the starting of the motor vehicle, to a value stored as a last valid value of the correction value and compensation that existed immediately after the engine of the motor vehicle had been turned off.

28. An arrangement according to claim 27, wherein said means for determining the compensation factor determines the compensation factor immediately after engine starting with a short time constant, and wherein for each calculation of the sliding average value of the compensation factor, this average value is composed of 1/n of a newly determined compensation factor and (n−1)/n of a previously determined value.

29. An arrangement according to claim 28, wherein, after a predetermined number of calculations of the sliding average value and after the sliding average value has reached a newly determined relative longitudinal speed difference, the newly determined value is compared with the stored value, and the average value calculation is continued with the new value when the new value is higher than the old value;

said value calculation is also continued when the new value amount has changed its preceding sign; and wherein except for the higher value occurring and except for a change of sign occurring the calculation is continued with the old value.

30. An arrangement according to claim 18, including means for increasing a limit control criteria by a certain amount, until a change can again occur; and wherein before such a change can be sensed an immediate control of the control element for limiting the rotational speed difference occurs and wherein this limiting has been maintained for a given first time period.

31. An arrangement according to claim 18 including, means for increasing a limit control criteria by a certain amount until an change can again occur after an increased limiting in the driving operation has been present for a given second time period.

32. An arrangement according to claim 18, including means for providing a driving-speed-dependent limit criterion, which consists of a first tolerance band valid for positive longitudinal speed differences and a second tolerance band valid for negative longitudinal speed differences;

and wherein the control apparatus controls the control element to increase said limit control when an upper limit of the first tolerance band is exceeded as well as when there is a falling below of a lower limit of the second tolerance band and wherein the limit control is reduced when there is a falling below a lower limit of the first tolerance band as well as when there is an exceeding of an upper limit of the second tolerance band; and otherwise said limit is maintained; and wherein during positive values of the correction value, the changing means only modifies an upper limit of the first tolerance band, and during negative values of the correction value, only modifies a lower limit of the second tolerance band.

33. An arrangement for controlling the power transmission to at least two powered axles of a motor vehicle, having a controllable friction element for limiting rotational speed compensation between the axles;

a control apparatus for controlling the friction element, by a control element as a function of operating parameters sensed by sensors;

wherein the control apparatus also includes a cornering correction device which comprises:

means for recognizing a cornering of the motor vehicle from wheel speeds measured at the wheels of the motor vehicle by speed sensors; and means responsive to the recognizing means for correcting a driving-speed-dependent limit criteria of said control apparatus during: longitudinal speed differences below longitudinal speed differences necessary for wheel switch run without any slip and also for wheels that run with an identical wheel slip; a speed difference between a rotational speed of the wheels of the first powered axle and a rotational speed of the wheels of the second powered axle; and wherein the means responsive limits rotational speed compensation when the vehicle operates in a lower vehicle speed range and below a certain cornering radius so that an increase the longitudinal speed difference caused by the cornering is at least approximately compensated.

34. An arrangement according to claim 33, wherein the cornering correction devices determine the amount of cornering correction as a product of a first constant factor with a difference between a relative lateral speed difference and a constant during a medium speed of a first powered axle, and wherein the lateral speed differential is determined from at least one of the averaged sum of amounts of the speed differentials of the wheels at both powered axles and from the amount of the difference of the average speeds of the wheels of one vehicle side.

35. An arrangement according to claim 34, wherein the cornering correction device sets the amount of cornering correction to zero when the longitudinal speed difference between a medium speed of the wheels of a first powered axle and of a medium speed of the wheels of a second powered axle is higher than zero as well as when the speed difference is lower than half the cornering correction value.

\* \* \* \* \*